United States Patent [19]

Seo

[11] Patent Number: 5,801,774
[45] Date of Patent: Sep. 1, 1998

[54] CAMCORDER WITH DETACHABLE AND ROTATABLE VIEWFINDER ASSEMBLY

[75] Inventor: Jin-Woo Seo, Seoul, Rep. of Korea

[73] Assignee: LG Electronics Inc., Seoul, Rep. of Korea

[21] Appl. No.: 562,518

[22] Filed: Nov. 24, 1995

[30] Foreign Application Priority Data

Nov. 25, 1994 [KR] Rep. of Korea ............... 31338/1994

[51] Int. Cl.$^6$ .................................................. H04N 5/225
[52] U.S. Cl. ........................................ 348/333; 348/375
[58] Field of Search ............................... 348/373, 333, 348/375, 376; D16/202, 208; 396/373, 383

[56] References Cited

U.S. PATENT DOCUMENTS

| | | | |
|---|---|---|---|
| D. 372,255 | 7/1996 | Nakamura | D16/202 |
| 4,959,729 | 9/1990 | Fukuda et al. | 348/375 |
| 5,442,453 | 8/1995 | Takagi et al. | 348/333 |
| 5,559,554 | 9/1996 | Uekane et al. | 348/333 |
| 5,592,224 | 1/1997 | Shim | 348/333 |

FOREIGN PATENT DOCUMENTS

05183779  7/1993  Japan ................ H04N 5/225

*Primary Examiner*—Wendy Garber

[57] ABSTRACT

A camcorder includes a detachable viewfinder assembly to enable more convenient and comfortable viewing of a viewfinder. The viewfinder assembly includes a support plate, a strap body, and a viewfinder rotatably connected to the strap body. According to the present invention, one of the viewfinder and the strap body is fixedly connected to the support plate. The support plate is preferably mounted so as to be rotatable relative to the camcorder. The viewfinder is preferably an LCD display. The strap body may also be provided with a handstrap, which offers an alternative means for a user to hold the camcorder. The viewfinder according to the present invention may therefore be laterally movable and tiltably movable.

37 Claims, 7 Drawing Sheets

CAMCORDER WITH DETACHABLE AND ROTATABLE VIEWFINDER ASSEMBLY

BACKGROUND OF THE INVENTION

1. Field of the Invention

The present invention relates to a camcorder with a detachable and rotatable liquid crystal display (hereinafter called the "LCD") assembly having a tiltable LCD viewfinder and a strap body attached thereto, and particularly to a camcorder with a detachable and rotatable LCD assembly having a tiltable LCD viewfinder and a strap body attached thereto, so that a user of camcorder can more easily picture a desired object by providing a detachable and rotatable LCD assembly having a tiltable LCD viewfinder and a strap body.

2. Description of the Related Art

Figure 1:
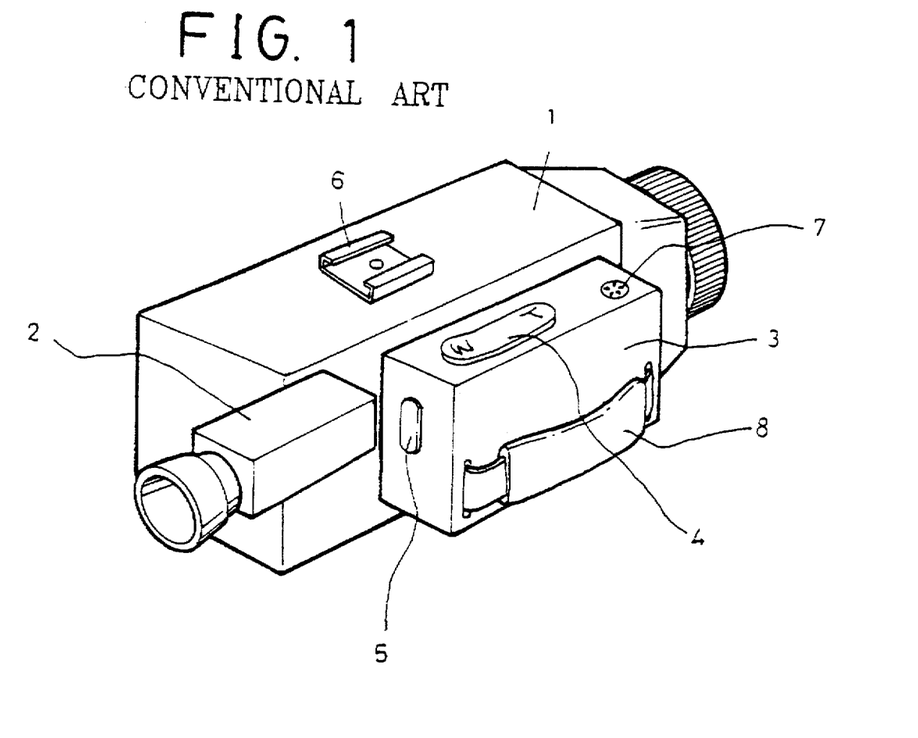
FIG. 1 is a perspective view showing a conventional camcorder.
Figure 2:
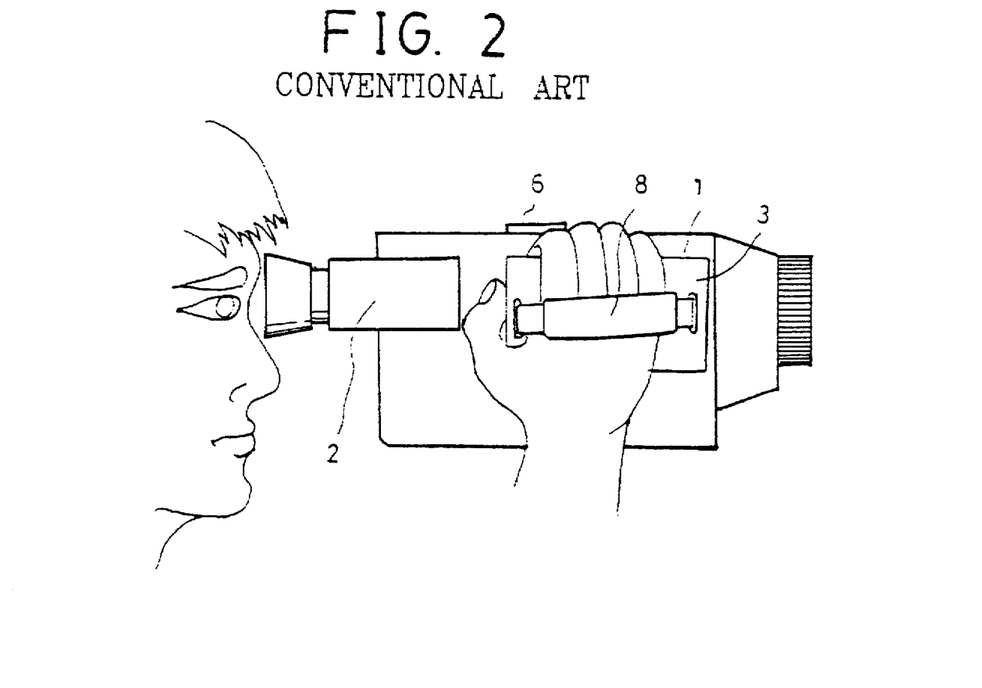
FIG. 2 is a side view showing a conventional camcorder in use.
Figure 3:
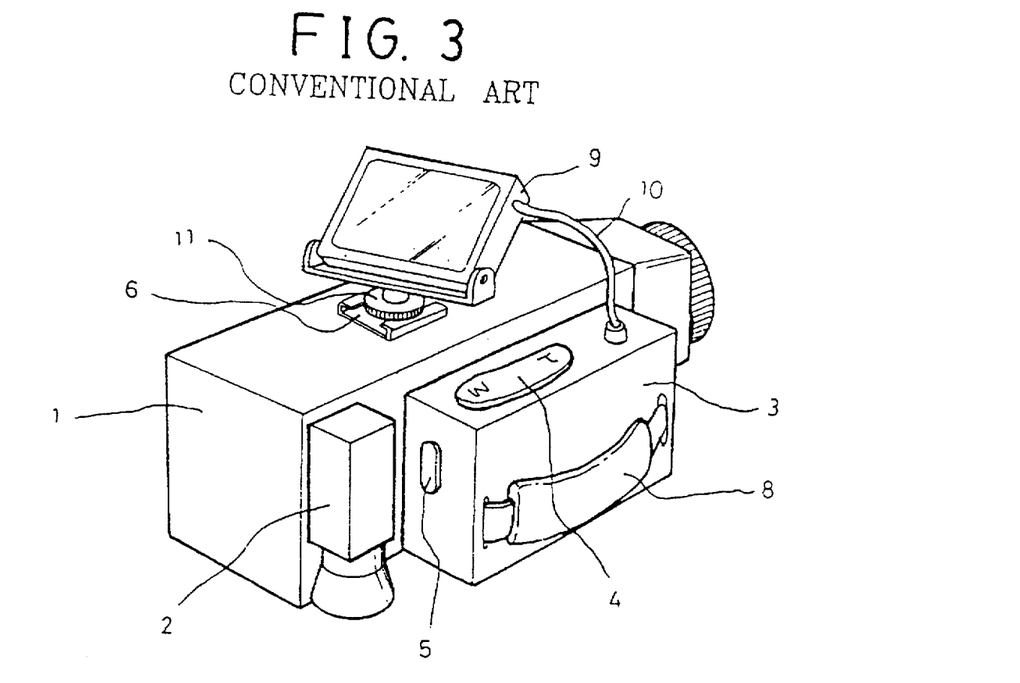
FIG. 3 is a perspective view showing a conventional camcorder equipped with an LCD viewfinder.

Referring to FIGS. 1 and 3, a conventional camcorder includes an LCD viewfinder mounting shoe 6 on a predetermined portion of the upper surface of a camcorder body 1 for mounting a light or an LCD viewfinder 9. The LCD viewfinder 9 is tightened to the camcorder body 1 by a fixing member 11.

In addition, a tiltable viewfinder 2 is provided on one side of the camcorder body 1, and a strap body 3 is disposed at one side of the camcorder body 1.

A zoom switch 4 and a socket 7 are provided on the upper surface of the strap body 3, and a recording button 5 is disposed at the rear surface thereof. A strap 8 is disposed at one side of the strap body 3.

FIG. 3 shows a conventional camcorder equipped with an LCD viewfinder. As shown therein, the LCD viewfinder 9 is detachably engaged to the shoe 6 of the camcorder body 1.

A signal cable 10 is connected between the socket 7 and the LCD viewfinder 9.

Figure 4:
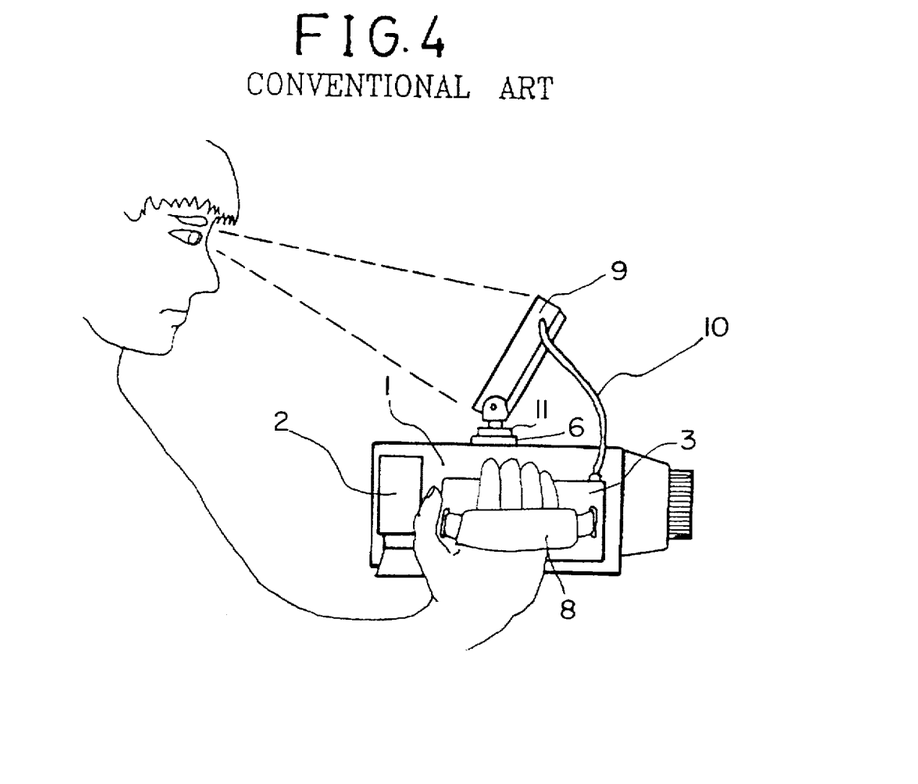
FIG. 4 is a side view showing a conventional camcorder equipped with an LCD viewfinder in use.

When using the camcorder, a user holds the strap 8 and controls the recording button 5 and the zoom switch 4 (see FIG. 4).

Meanwhile, when picturing a desired object using the LCD viewfinder 9, since the signal cable 10 is connected between the socket 7 and the LCD viewfinder 9, the LCD viewfinder 9 receives a video signal from a certain element of the camcorder body 1.

However, when a user pictures a desired object using the LCD viewfinder, i.e., not using the viewfinder 2, it is difficult to hold the camcorder because the user must hold the LCD viewfinder relatively away form his eyes in order to clearly focus on it.

In addition, it is difficult to use the zoom switch and the recording button at the same time while viewing the LCD viewfinder because the strap are not rotatable or tiltable. This makes gripping the camcorder awkward.

SUMMARY OF THE INVENTION

Accordingly, it is an object of the present invention to provide a camcorder with a detachable and rotatable LCD assembly having a tiltable LCD viewfinder and a strap body, which overcomes the problems describe above.

It is another object of the present invention to provide a camcorder with a detachable and rotatable LCD assembly having a tiltable LCD viewfinder and a strap body, so that a user can more easily view a desired object To achieve the above objects, in accordance with a first embodiment of the present invention, a camcorder is provide with a detachable and rotatable LCD assembly having a tiltable LCD viewfinder and a strap body. The camcorder includes a camcorder body having a first strap body disposed at one side thereof, a first operating unit having a first zoom control switch and a first recording button, a strap disposed at one side of the first strap body, and a shoe disposed at a predetermined portion of the upper surface of the camcorder body; and an LCD assembly member including a second strap body fixed to a predetermined portion of a substantially rectangular support plate by a plurality of fixing members such as screws, and an LCD viewfinder tiltably mounted on the second strap body.

To achieve the above objects, in accordance with a second embodiment of the present invention, a camcorder is provided with a detachable and rotatable LCD assembly having a tiltable LCD viewfinder and a strap body. The camcorder includes a camcorder body having a first strap body disposed at one side thereof, a first operating unit having a zoom switch for zooming an object to be pictured and a recording button, a strap disposed at one side of the first strap body, and a shoe disposed at a predetermined portion of the upper surface of the camcorder body; and an LCD assembly including a second strap body, and an LCD viewfinder tiltably mounted on the second strap body and fixed to a predetermined portion of a substantially rectangular support plate by a plurality of fixing members such as screws.

DETAILED DESCRIPTION OF THE INVENTION

The construction of a camcorder with a detachable and rotatable LCD viewfinder assembly according to a first embodiment of the present invention will now be explained.

Figure 5:
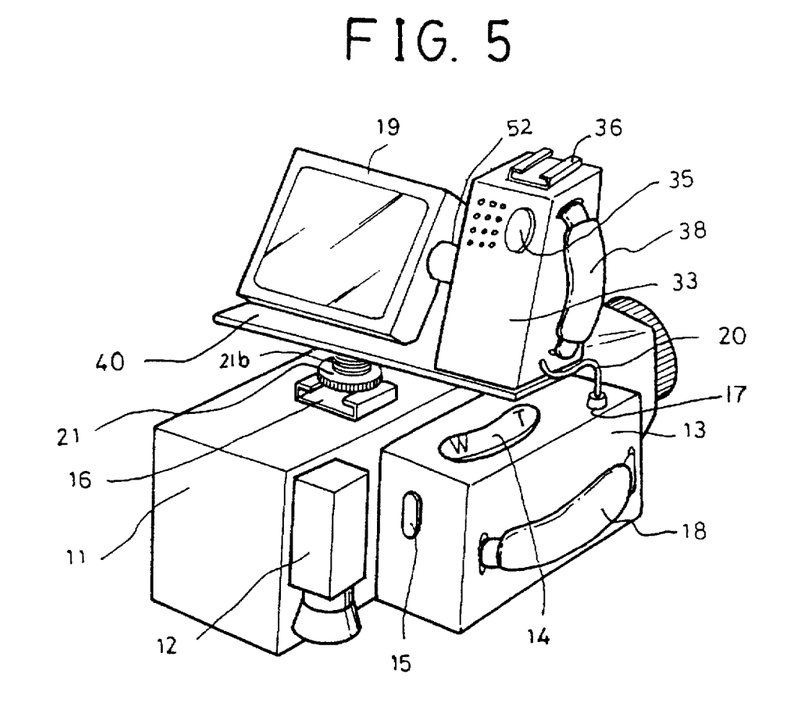
FIG. 5 is a perspective view showing a camcorder equipped with a detachable and rotatable LCD assembly having a tiltable LCD viewfinder and a strap body, according to the present invention.
Figure 6:
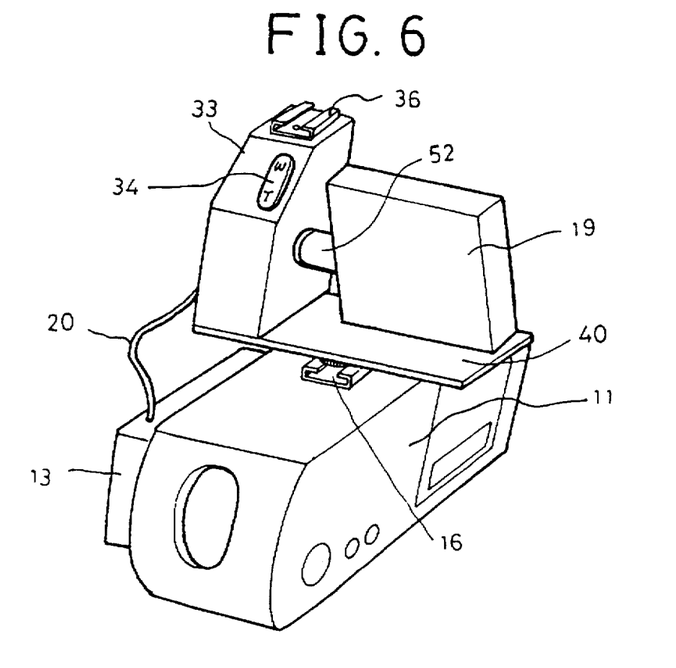
FIG. 6 is a perspective view showing the camcorder illustrated in FIG. 5.

Referring to FIG. 5, a first shoe 16 is provided on a predetermined portion of the upper surface of a camcorder body 11 for mounting a light or an LCD viewfinder 19.

In addition, another viewfinder 12 is tiltably disposed at one side of the camcorder body 11, and a first strap body 13 is disposed at one side of the camcorder body 11, spaced apart from the viewfinder 12.

The LCD viewfinder assembly includes a rectangular support plate 40, an LCD viewfinder 19, and a second strap body 33.

A first operation unit having a first zoom control switch 14 and a first recording button 15 is disposed at one side of the first strap body 13.

In addition, a socket 17 is disposed at a predetermined portion of the first strap body 13, and a first strap 18 is disposed at one side of the first strap body 13.

Figure 8:
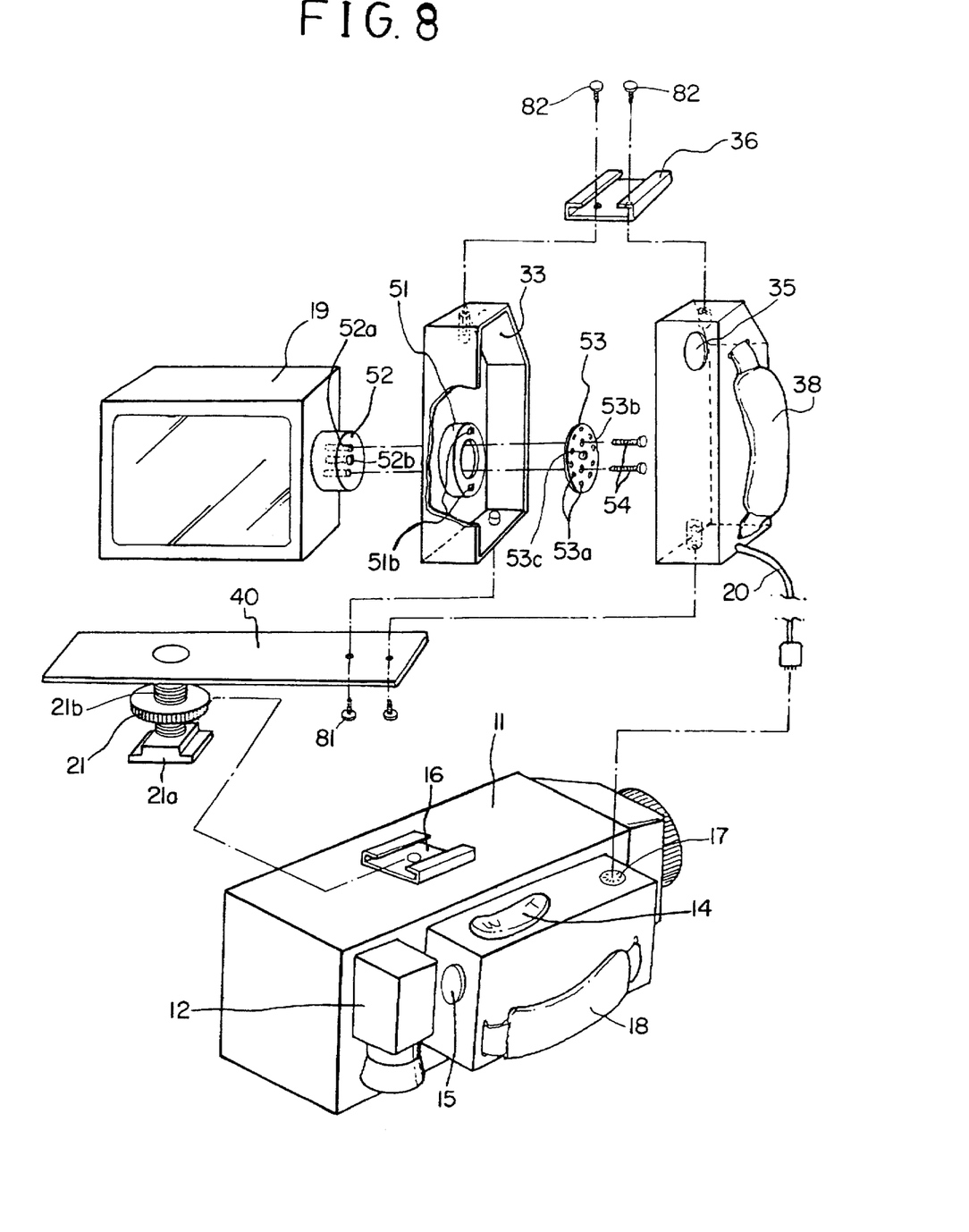
FIG. 8 is a perspective view showing a disassembled LCD assembly and a camcorder according to the present invention.

A foot 21a of the support plate 40 is inserted into the first shoe 16 of the camcorder body 11.

A second strap body 33 is fixedly mounted on a predetermined portion of the upper surface of a support plate 40 by, for example, a plurality of screws 81. Here, the foot 21a have a threaded fixing member 21 threaded onto a threaded shaft 21b and the support plate 40 are detachable from the first shoe 16 of the camcorder body 11. In addition, the threaded shaft 21b is tightly rotatably fixed to the support plate 40, so that a user can picture a desired object at different angles by rotating the LCD assembly in a desired direction about the threaded shaft 21b. Moreover, the threaded shaft 21b is fixed to the foot 21a by way of fixing member 21.

In addition, a second operation unit having a second zoom control switch 34 and a second recording button 35 is provided at the second strap body 33.

Figure 9:
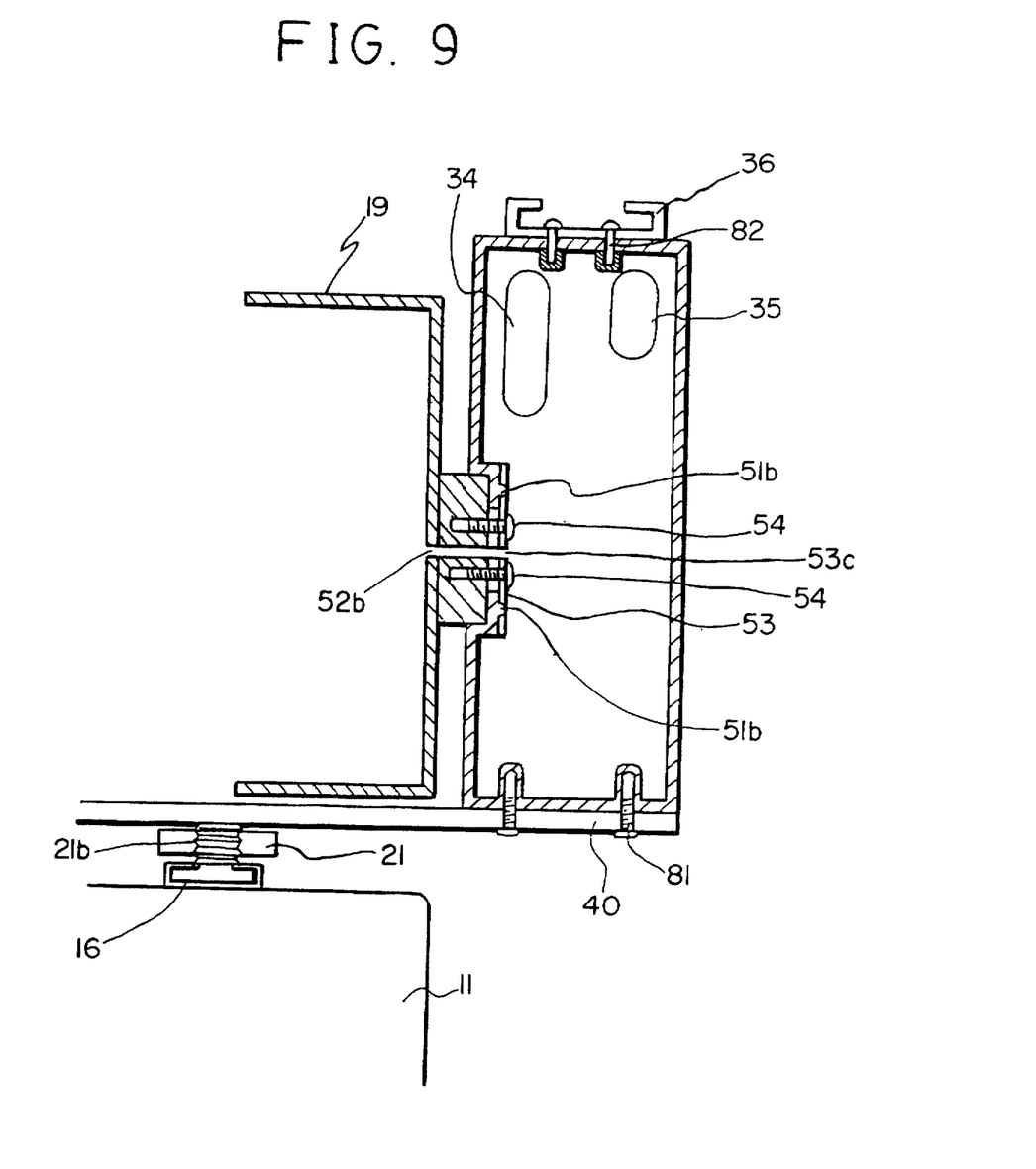
FIG. 9 is a cross-sectional view showing an LCD assembly having an LCD viewfinder and a strap body so as to show an engaging state therebetween.
Figure 10:
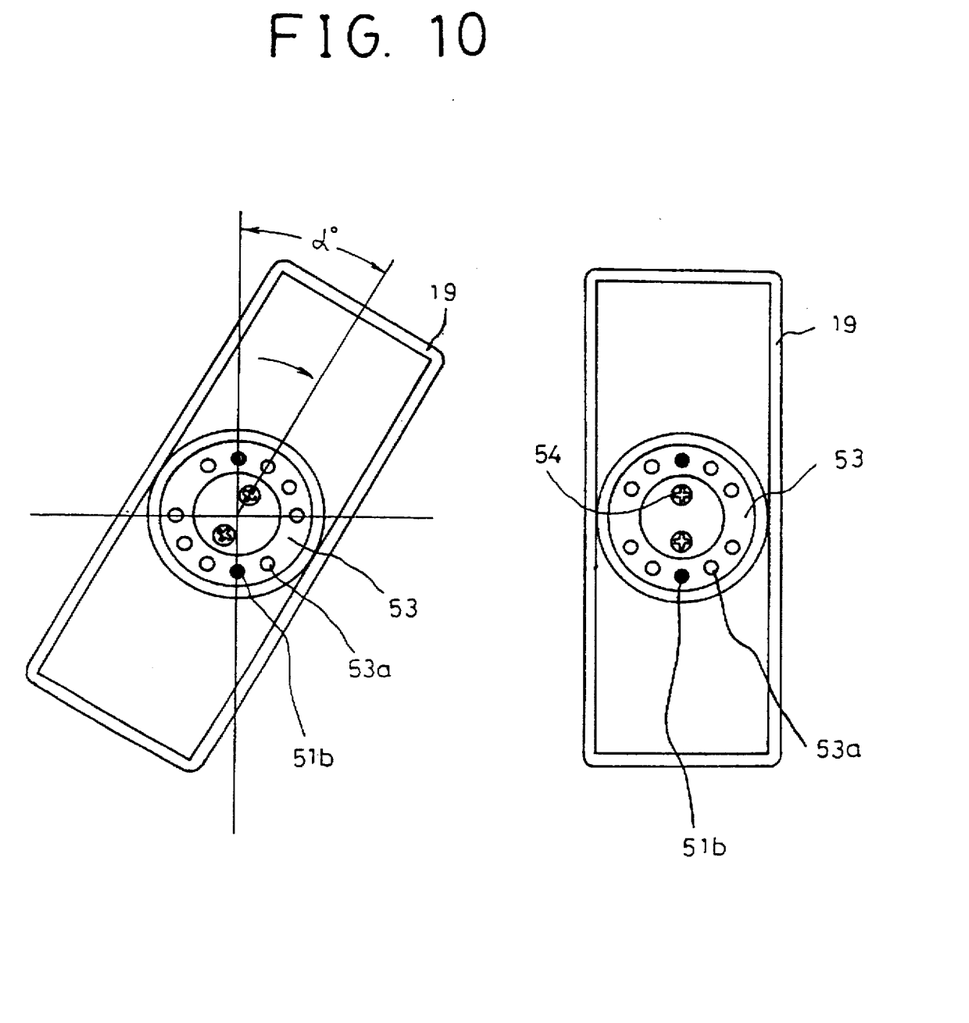
FIG. 10 is a side view of an LCD viewfinder according to the present invention.

Meanwhile, the LCD viewfinder 19 is rotatably engaged to a predetermined portion of the second strap body 33 through an annular engaging section 52, a hollow annular section 51 extending inwardly from one side wall of the second strap body 33 and having at least spaced-apart two semicircular protrusions 53a formed on the upper surface thereof, and an elastic plate 53b having a plurality of holes centrally formed on the outer edge portion thereof for limiting the rotation of the LCD viewfinder 19 and aligned with the semicircular protrusions 53a formed on the upper surface of the hollow annular section 51. Here, the annular engaging section 52 and the elastic plate 53b are fixed by two screws 54 to each other. Annular engaging section 52 has a hole 52a formed therethrough through which signal cables connecting the LCD viewfinder 19 and the second strap body 38 extend.

Meanwhile, a second shoe 36 is provided on a predetermined portion of the second strap body 33 for mounting a light or a microphone thereon by a plurality of screws 82.

The operation of a camcorder with a detachable and rotatable LCD assembly having a tiltable LCD viewfinder and a second strap body will now be explained with reference to accompanying drawings.

Figure 7:
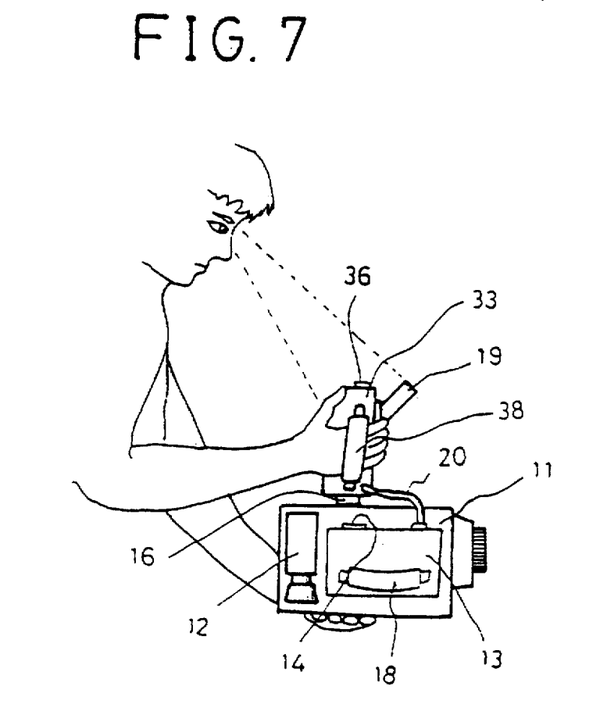
FIG. 7 is a side view showing a camcorder equipped with a detachable and rotatable LCD assembly having a tiltable LCD viewfinder and a strap body according to the present invention in use.

When a user views a desired object using the LCD viewfinder 19, the user holds the first strap 14 of the first strap body 13 or the second strap 38 of the second strap body 33, after mounting the LCD assembly on the first shoe 16 by inserting the foot 21a into the first shoe 16 and connecting the second strap body 33 and the socket 17 by the signal cable 20. In addition, the user checks the picture being recorded through the LCD viewfinder 19, while controlling the first zoom control switch 14 or the first recording button 15, or the second zoom control switch 34. At this time, when the user wishes to view an object at a wide angle or at a tele-angle, the user can rotate or tilt the LCD viewfinder, so that the user can picture a desired object at a desired different angle by rotating the LCD assembly or tilting the LCD viewfinder 19.

A second embodiment of the present invention is directed to providing a detachable and rotatable LCD assembly having a rectangular support plate, an LCD viewfinder, and a second strap body. Here, the LCD viewfinder is fixed to a predetermined portion of the upper surface of the support plate, and is rotatably connected to the second strap body. Here, the second strap body is not fixed to the support plate.

As described above, a camcorder with detachable and rotatable LCD assembly having a tiltable LCD viewfinder and a strap body includes a detachable and rotatable LCD assembly so that a user can more easily picture a desired object at a desired different angle.

What is claimed is:

1. A camcorder comprising:
   a camcorder body a first strap body disposed at a side of said camcorder body, and a first operating unit provided with a camcorder function control, and
   a viewfinder assembly detachably mounted on said camcorder body, comprising:
      a support plate detachably mounted on said camcorder body such that said support plate is rotatable relative to said camcorder body,
      a second strap body fixedly mounted on said support plate, and
      a tiltably rotatable viewfinder mounted on said second strap body.

2. The camcorder of claim 1, wherein said camcorder body includes a first mounting shoe provided thereon and said support plate includes a mounting foot constructed and arranged to be detachably received by said first mounting shoe.

3. The camcorder of claim 1, wherein said viewfinder has a protruding annular engaging section formed on one side thereof and having a hole formed in a central portion thereof for passing a signal cable therethrough, said signal cable electrically connecting said viewfinder and said second strap body.

4. The camcorder of claim 3, wherein said second strap body includes an annular recessed section formed on one side thereof and a plurality of substantially semicircular protrusions formed on an upper surface thereof.

5. The camcorder of claim 4, wherein said protruding annular engaging section of said viewfinder is received by said annular recessed section of said second strap body and is fixed by a plurality of screws passed through a circular elastic plate.

6. The camcorder of claim 5, wherein said circular elastic plate includes a plurality of holes centrally formed thereon and contacting said semicircular protrusions formed on said annular recessed section of said second strap body, whereby a range of relative rotation between said viewfinder and said second strap body is limited.

7. The camcorder of claim 2, wherein said second strap body includes a second mounting shoe provided thereon.

8. The camcorder of claim 1, wherein said first and second strap bodies include first and second straps attached thereto, respectively.

9. The camcorder of claim 1, wherein said first and second strap bodies are provided with first and second camcorder function controls, respectively.

10. The camcorder of claim 2, wherein said mounting foot is rotatably mounted on a shaft connected to said support plate, whereby said support plate is rotatable about said shaft.

11. The camcorder of claim 10, comprising a tightening member provided on said shaft and constructed and arranged to selectively fix said mounting foot relative to said first mounting shoe.

12. The camcorder of claim 1, wherein said camcorder function control is a zoom control.

13. The camcorder of claim 1, wherein said camcorder function control is a recording control.

14. The camcorder of claim 9, wherein said second camcorder function control is a zoom control.

15. The camcorder of claim 9, wherein said second camcorder function control is a recording control.

16. The camcorder of claim 1, wherein said viewfinder is a LCD screen.

17. The camcorder of claim 1, further comprising a second viewfinder.

18. A camcorder comprising:
 a camcorder body having a first strap body disposed at a side thereof, and a first operating unit provided with a first camcorder function control; and
 a viewfinder assembly detachably mounted on said camcorder body, comprising:
  a support plate mounted on said camcorder body such that said support plate is rotatable relative to said camcorder body and selectively releasable therefrom,
  a viewfinder fixedly mounted to said support plate; and
  a second strap body rotatable mounted on said fixedly mounted viewfinder.

19. The camcorder of claim 18, wherein said camcorder body is provided with a mounting shoe and said support plate has a mounting foot constructed and arranged to be detachably received by said mounting shoe.

20. The camcorder of claim 18, wherein said viewfinder has a protruding annular engaging section at a side wall thereof and having a hole in a central portion for passing a signal cable therethrough, said signal cable electrically connecting said viewfinder and said second strap body.

21. The camcorder of claim 20, wherein said second strap body includes an annular recessed section formed on a side wall thereof and having a plurality of semicircular protrusions formed on an upper surface thereof.

22. The camcorder of claim 21, wherein said annular engaging section of said viewfinder is inserted into said annular recessed section of said second strap body and is fixed by a plurality of screws through a circular elastic plate.

23. The camcorder of claim 22, wherein said circular elastic plate includes a plurality of holes, said holes being centrally formed thereon and contacting said semicircular protrusions formed on said annular recessed engaging section of said second strap body, whereby a range of relative rotation between said viewfinder and said second strap body is limited.

24. The camcorder of claim 18, wherein said second strap body includes a second mounting shoe provided thereon.

25. The camcorder of claim 18, wherein said first and second strap bodies include first and second straps attached thereto, respectively.

26. The camcorder of claim 18, wherein said first and second strap bodies are provided with first and second camcorder function controls, respectively.

27. The camcorder of claim 19, wherein said mounting foot is rotatably mounted on a shaft connected to said support plate, whereby said support plate is rotatable about said shaft.

28. The camcorder of claim 18, comprising a tightening member provided on said shaft and constructed and arranged to selectively fix said mounting foot relative to said first mounting shoe.

29. The camcorder of claim 18, wherein said camcorder function control is a zoom control.

30. The camcorder of claim 18, wherein said camcorder function control is a recording control.

31. The camcorder of claim 26, wherein said second camcorder function control is a zoom control.

32. The camcorder of claim 26, wherein said second camcorder function control is a recording control.

33. The camcorder of claim 18, wherein said viewfinder is a LCD screen.

34. The camcorder of claim 18, further comprising a second viewfinder.

35. A detachably mountable viewfinder assembly for a camcorder, comprising:
 a support plate;
 a strap body; and
 a viewfinder rotatably mounted relative to said strap body;
 wherein one of said strap body and said viewfinder is fixedly mounted on said support plate.

36. The viewfinder assembly according to claim 35, wherein said support plate includes a mounting foot mounted on a shaft connected to said support plate, said mounting foot being rotatable relative to said support plate.

37. The viewfinder assembly according to claim 36, wherein said viewfinder is an LCD display.

* * * * *